Dec. 8, 1925.
T. W. GREEN
1,564,346
GAS AND VAPOR MIXER FOR HEATING FURNACES
Filed Jan. 18, 1924   2 Sheets-Sheet 1
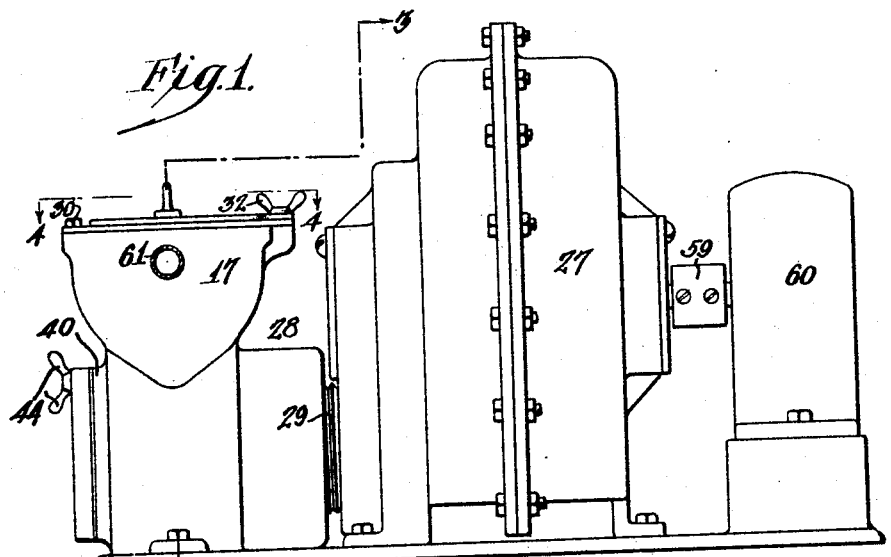
Fig.1.
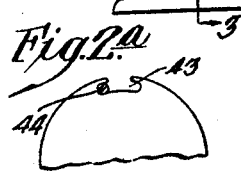
Fig.2.ᵃ
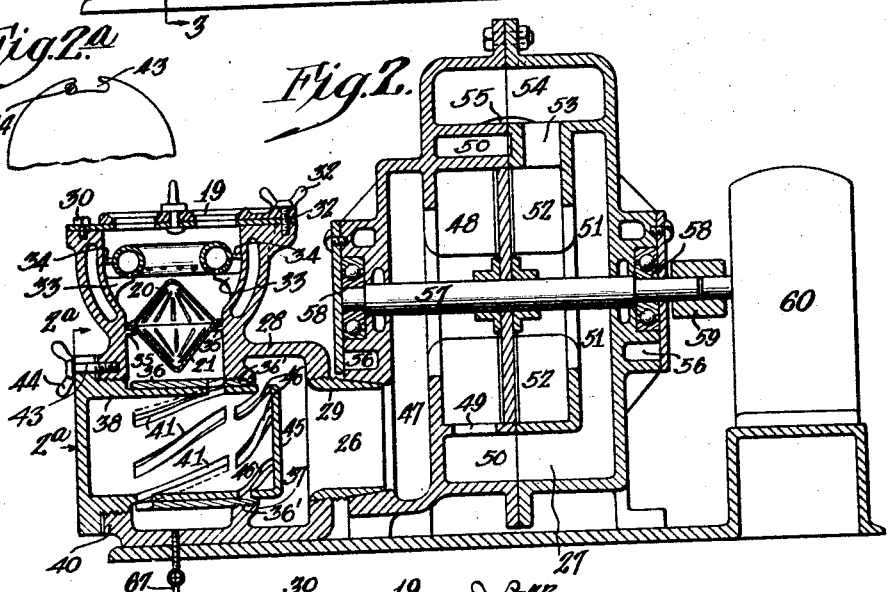
Fig.2.
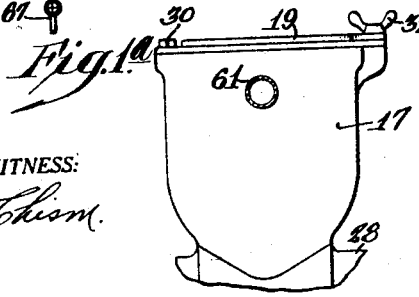
Fig.1.ᵃ
WITNESS:
Walter Chism.
INVENTOR
Thomas W. Green.
BY
ATTORNEY

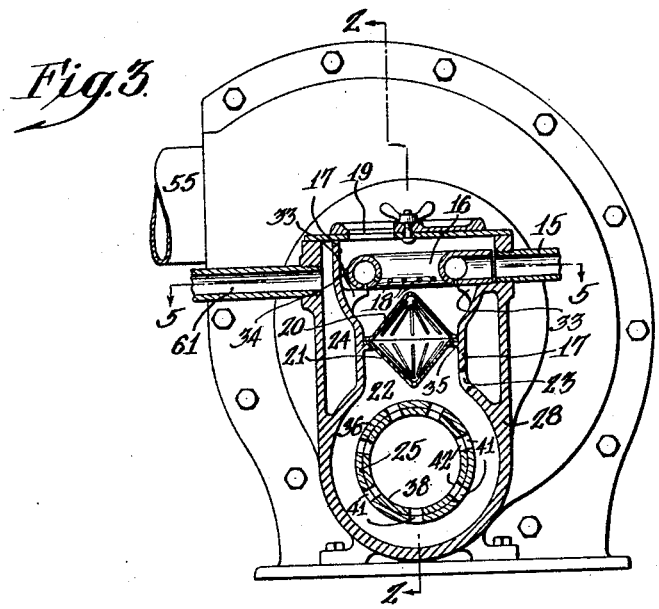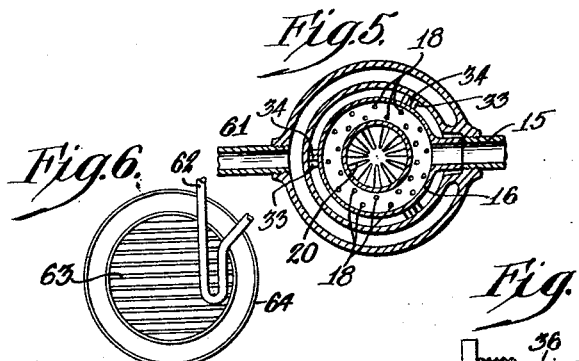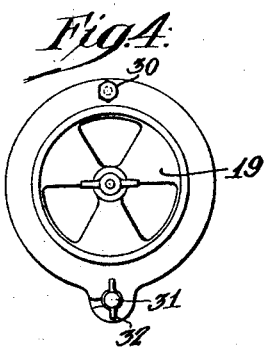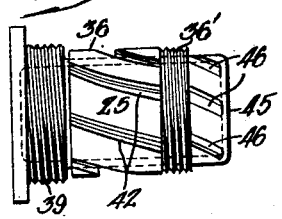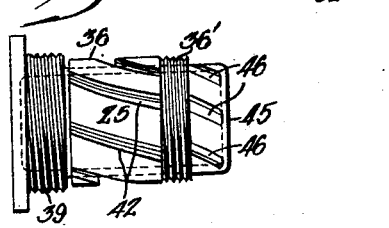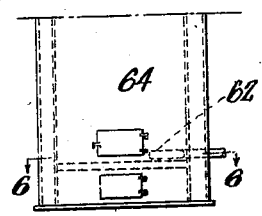

Patented Dec. 8, 1925.

1,564,346

UNITED STATES PATENT OFFICE.

THOMAS W. GREEN, OF PHILADELPHIA, PENNSYLVANIA.

GAS AND VAPOR MIXER FOR HEATING FURNACES.

Application filed January 18, 1924. Serial No. 687,159.

*To all whom it may concern:*

Be it known that I, THOMAS W. GREEN, a citizen of the United States, residing at Philadelphia, in the county of Philadelphia and State of Pennsylvania, have invented a certain new and useful Gas and Vapor Mixer for Heating Furnaces, of which the following is a specification.

My invention relates to carbureters for use with heating furnaces.

The purpose of my invention is to obtain a novel form of carbureter adapted to throughly mix oil-vapor or fuel-gas with air for subsequent combustion in furnaces.

A further purpose is to heat the air which is to be mixed with the oil-vapor or fuel gas in the carbureter after partial mixture of the air with the vapor or gas.

A further purpose is to pass the mixed vapor or gas and air through spiral passages in order to additionally mix the material.

A further purpose is to control the amount of flow of mixed oil and gas by adjustment of the same spiral passages as are used to improve the mixing.

Further purposes will appear in the specification and in the claims.

Of the different forms of my invention I have selected one only for illustration, taking a form however that illustrates particularly well the principles involved.

Figure 1 is an assembly view of my equipment in side elevation.

Figure 1ª is a fragmentary side elevation showing a modified detail from Figure 1.

Figure 2 is a section on line 2—2 of Figure 3.

Figure 2ª is a fragmentary detail section of Figure 2 taken upon the line 2ª—2ª.

Figure 3 is a section of Figure 1 taken upon the line 3—3.

Figure 4 is a plan view of a detail and corresponds to a view taken upon the line 4—4 of Figure 1.

Figure 5 is a section of Figure 3 taken upon the line 5—5.

Figure 6 is a section of Figure 7 taken upon the line 6—6.

Figure 7 in reduced scale illustrates one way of preheating air for the carbureter.

Figure 8 is a side elevation of a detail.

Figures 9 and 10 are a top plan and a side elevation, respectively, of another detail.

In all figures like numerals refer to like parts.

Describing in illustration and not in limitation and referring to the drawings:—

The fuel, which may be gas, oil-vapor or oil, is admitted through a pipe 15 to fuel ring 16 within bowl 17, and enters the bowl from the ring through small holes 18, where it mixes with a regulated quantity of air entering the bowl through the adjustable shutter damper or valve 19.

From the bowl the mixture of air and fuel passes down through the slotted mixing cones 20 and 21 into the chamber 22, where it is mixed with additional air, preferably preheated, and entering the chamber 22 through one or more ports 23 from the jacket 24 about the bowl 17. The chamber 22 discharges through the slotted sleeve valve 25 to the intake 26 of any suitable exhauster 27 for delivery to the furnace or furnaces (not shown). A single furnace or a plurality, separated or in bank may be supplied.

The jacketed bowl 17 and chamber 22 conveniently comprise a main casting 28, removable shutter valve closure 19 over the bowl, removable slotted sleeve valve 25 and discharge (exhauster intake) tube 29 to the exhauster. Obviously the bowl may be of any convenient length,—short, as seen in Figure 1, or long as seen in Figure 1ª.

The shutter valve is of any usual type and is held in place over the bowl by bolts 30 and 31 screwed into the rim of the bowl. One or other of these bolts is preferably given a wing head 32 and the valve is slotted for easy side movement. The shutter valve structure then pivots on the other bolt and may be turned to uncover the bowl. The ring member 16 may then be lifted out for cleaning or inspection. This ring member is conveniently supported upon circumferentially spaced lugs or brackets 33 that are preferably integral with the casting 28 and is spaced from the sides of the bowl by lugs 34.

The mixing cones 20 and 21 may be of cast or sheet metal according to circumstances. They extend across the outlet opening of the bowl, base to base, and the lower base rests upon lugs 35 near the outlet of the bowl.

The slotted sleeve valve 25 comprises an external slotted sleeve 36 threaded at 36' into the boss 37 of the main casting and an inner sleeve 38 loosely threaded at 39 into the outer boss 40 of the main casting. The preferably spiral or diagonal slots 41 and 42, respectively, of the inner and outer sleeves register to any desired extent according to the angular position of the outer sleeve, as determined by the position of the recess 43 in the outer rim of the outer sleeve with respect to the wing bolt 44. The bolt 44 locks the valve shut or open to any desired extent.

I prefer to close the front end of the inner sleeve, as seen at 45, delivering the mixture of air and fuel radially through spiral or diagonal slots 46 to the intake of the exhauster.

The exhauster may be of any suitable type. Where the mixture of air and fuel is at high temperature, the exhauster must be able to withstand such high temperature. In the illustration the exhauster is a Green turbo blower upon which I have been granted U. S. Patent No. 1,350,724, dated August 24, 1920, but is intended to be typical of pumps and suction devices generally. It is not shown in full detail here. The blower shown is two stage, the gaseous mixture entering the first stage at 47 whence the blades 48 deliver radially through port 49 into chamber 50, which delivers at 51 to the second stage impellers 52. These in turn deliver radially through ports 53 into the discharge chamber 54 and discharge pipe 55. For detailed description of this blower reference may be had to the patent above referred to.

I have shown at 56 passages for water cooling the bearings. The impellers are rigidly carried upon the shaft 57, turning in suitable bearings 58 and coupled at 59 to motor 60.

According to circumstances, either the air supplied to jacket 24 around the bowl through pipe 61 or the fuel supplied to the ring 16 through pipe 15 may desirably be preheated. This preheating may be accomplished in any convenient way, for example as illustrated in Figures 6 and 7, where an air supply pipe 62 is placed above a grate 63 of any suitable furnace 64, which may conveniently be the furnace or one of the furnaces supplied with fuel by my device.

It will be understood that the mixture of air and fuel entering the exhauster should normally be free from particles of liquid fuel, the fuel mixed with the air being either in gaseous or vapor form; and, further, that the gaseous fuel-air mixture should not be too rich in fuel for explosive combustion within the apparatus, the requisite additional air for proper combustion being added at the furnace or furnaces.

Where the fuel used is a relatively non-volatile liquid, as oil, it should be preheated before delivery into the bowl to a temperature well above its "flash point"; likewise the air supply to the jacket 24 and into the chamber 22 through the ports 23 should be preheated to a temperature well above the flash temperature of the oil, so that the average temperature in the apparatus from the mixing cones to the intake of the compressor is well above this flash temperature. This condition secures readily and maintains the requisite richness of the mixture of fuel and air. The shutter valve lends itself to regulation of the temperature within the apparatus, by adjusting the relative proportion of cool and hot air; so that slightly opening the shutter will mean a leaner mixture and, vice versa, slightly closing it a richer mixture.

It will be noted that in view of the sudden changes in direction of flow at the mixing cones and at the double sleeve valve, these members act as efficient separators to throw down any particles of liquid carried by the flowing gaseous mixture; liquid fuel thus separated flows to the bottom of the chamber 22 whence it may be removed by a pipe 67 for return to the fuel supply.

It will be noted that the mixture formed is piped direct—as through pipe 55—to the furnace or furnaces, in which it is to be used like gas without need for other spraying or mixing devices or special burners.

In view of my invention and disclosure, modifications and variations to meet individual whim or particular need will doubtless become evident to others skilled in the art and I claim all such in so far as they fall within the reasonable spirit and scope of my invention.

Having thus described my invention, what I claim as new and desire to secure by Letters Patent is:—

1. In a mixing device for fluid with air, an inlet chamber having an adjustable air inlet opening, a fluid discharge into said chamber, a heating casing about the chamber, means for supplying preheated air for said casing adapted to discharge into the lower part of the chamber to mix the heated air with the air and vapor of the chamber, a control valve providing admission about its circumference and an exhauster adapted to draw the mixture from said chamber through said valve.

2. In a mixing device for fluid with air, an inlet chamber having an adjustable air inlet opening, a fluid discharge into said chamber, a heating casing about the chamber, means for supplying preheated air for said casing adapted to discharge into the lower part of the chamber to mix the heated air with the air and vapor of the chamber, a separator for separating out unvaporized liquid, a circumferentially apertured valve beyond the separator and an exhauster adapted to draw the mixture from the chamber through the valve.

3. In a mixing device for fluid with air, an inlet chamber having an adjustable air inlet opening, a fluid discharge into said chamber, a heating casing about the chamber, means for supplying preheated air for said casing adapted to discharge into the lower part of the chamber to mix the heated air with the air and vapor of the chamber, a valve having spirally arranged openings adapted to distribute the mixture passing therethrough spirally and an exhauster adapted to draw the mixture from the chamber through the valve.

4. In a device for mixing fluid and air, the combination of hollow walls forming an inlet chamber and an inlet pipe thereto, an apertured ring discharge connection therefor removable and adapted to rest in line with the inlet, a support for the ring, means for heating inlet air connections for feeding the air through the hollow of the walls of the chamber, an exhauster connecting with the hollow to draw heated air through the walls and a valve between the ring discharge and the exhauster.

5. In a device for mixing fluid and air, the combination of hollow walls forming a mixing chamber, regulated air inlet thereto, a fuel inlet thereto, a removable ring distributor adapted to fit against the fuel inlet, positioning lugs to position the ring, supports for the ring, means for supplying hot air to the hollow of the walls, discharging into the fuel supplied by the ring discharge and an exhauster adapted to draw the mixture from the chamber and the heated air through the hollow of the walls.

6. In a device for mixing fluid and air, the combination with hollow walls forming an inlet chamber and a fuel inlet pipe thereto, of an apertured ring discharge connection therefor, removable and adapted to rest in line with the inlet, a support for the ring, means for heating inlet air connections for feeding the air through the hollow of the walls of the chamber, an exhauster connecting with the interior of the hollow walls to draw heated air through the walls, a valve between the ring discharge and the exhauter.

7. In a device for mixing fluid and air, the combination of hollow walls forming an inlet chamber, a fuel feed, means for mingling air with the fuel feed, a valve comprising spaced spiral inlet openings and an exhauster adapted to draw the mixture through the spiral openings.

8. In a device for mixing fluid and air, the combination with hollow walls forming an inlet chamber and a fuel inlet pipe thereto, of an apertured ring discharge connection therefor, removable and adapted to rest in line with the inlet, a support for the ring, means for heating inlet air connections for feeding the air through the hollow of the walls of the chamber, an exhauster connecting with the interior of the hollow walls to draw heated air through the walls, a valve between the ring discharge and the exhauster.

9. In a device for mixing fluid and air, the combination of hollow walls forming an inlet chamber, a fuel feed, means for mingling air with the fuel feed, a valve having a plurality of spirally disposed inlet passages and circumferential outlet passages and an exhauster adapted to draw the mixture through said passages.

10. In a device for mixing fluid and air, the combination with hollow walls forming an inlet chamber and a fuel inlet pipe thereto, of an apertured ring discharge connection for the inlet pipe, removable and adapted to rest in line with the inlet, a support for the ring, means for heating inlet air connections for feeding the air through the hollow of the walls of the chamber, an exhauster connecting with the hollow to draw heated air through the walls, and a valve between the ring discharge and the exhauster.

11. In a device for mixing fluid and air, the combination with hollow walls forming an inlet chamber, a fuel feed, means for mingling air with the fuel feed, a valve comprising outer and inner cylindrical valve members adjustable angularly with respect to each other and having mating angularly disposed inlet openings, and an exhauster for drawing the mixture through the valve.

12. In a device for mixing fluid and air, the combination with hollow walls forming an inlet chamber and an inlet pipe thereto, of an apertured ring discharge connection for the pipe, removable and adapted to rest in line with the inlet, a support for the ring, means for heating inlet air connections for feeding the air through the hollow of the walls of the chamber an exhauster connecting with the interior of the hollow walls to draw heated air through the walls, and a valve between the ring discharge and the exhauster.

13. In a device for mixing fluid and air, the combination with hollow walls forming an inlet chamber, a fuel feed, means for mingling air with the fuel feed, a valve comprising outer and inner cylindrical valve members adjustable angularly with respect to each other and having mating angularly disposed inlet openings, an exhauster for drawing the mixture through the valve and means for causing the mixture to pass out of the valve about its circumference.

14. In a device for mixing fluid with air in combination with a circumferentially discharging fuel inlet, walls forming a hollow casing about the inlet, means for heating the air fed to the casing, a separator in the casing below the discharge comprising an upwardly directed apertured dome, an exhauster drawing the mixture through the separator, and a valve between the separator and the exhauster.

15. In a device for mixing fluid with air, in combination with a circumferentially discharging fuel inlet, walls forming a hollow casing about the inlet, means for heating the air fed to the casing, a separator in the casing below the discharge comprising a downwardly directed apertured dome, an exhauster drawing the mixture through the separator and a valve between the separator and the exhauster.

16. In a device for mixing fluid with air, in combination with a circumferentially discharging fuel inlet, walls forming a hollow casing about the inlet, means for heating the air fed to the casing, a separator in the casing below the discharge comprising upwardly and downwardly directed apertured domes, an exhauster drawing the mixture through the separator and a valve between the separator and the exhauster.

THOMAS W. GREEN.